(12) United States Patent
Saito et al.

(10) Patent No.: US 7,068,637 B2
(45) Date of Patent: Jun. 27, 2006

(54) BASE STATION AND MOBILE COMMUNICATION SYSTEM

(75) Inventors: Joichi Saito, Yokohama (JP); Yuuji Ishida, Fujisawa (JP); Toshiro Suzuki, Tama (JP)

(73) Assignee: Hitachi, Ltd., Tokyo (JP)

( * ) Notice: Subject to any disclaimer, the term of this patent is extended or adjusted under 35 U.S.C. 154(b) by 755 days.

(21) Appl. No.: 09/794,343

(22) Filed: Feb. 28, 2001

(65) Prior Publication Data

US 2001/0040874 A1 Nov. 15, 2001

(30) Foreign Application Priority Data

May 12, 2000 (JP) .............................. 2000-144590

(51) Int. Cl.
*H04B 7/216* (2006.01)

(52) U.S. Cl. ...................... 370/342; 370/286; 370/289; 375/144; 375/148

(58) Field of Classification Search ................ 375/148; 370/278, 282, 320, 329, 335, 342, 438, 439, 370/441, 201, 286
See application file for complete search history.

(56) References Cited

U.S. PATENT DOCUMENTS

| | | | |
|---|---|---|---|
| 5,363,403 A * | 11/1994 | Schilling et al. | 370/441 |
| 5,467,368 A | 11/1995 | Takeuchi et al. | |
| 5,719,852 A * | 2/1998 | Schilling et al. | 370/201 |
| 6,088,383 A | 7/2000 | Suzuki et al. | |
| 6,298,050 B1 * | 10/2001 | van Heeswyk et al. | 370/335 |
| 6,473,417 B1 * | 10/2002 | Herzog | 370/342 |
| 6,526,271 B1 * | 2/2003 | Uesugi et al. | 455/296 |
| 6,570,909 B1 * | 5/2003 | Kansakoski et al. | 375/148 |
| 6,574,204 B1 * | 6/2003 | Lee | 370/335 |
| 6,594,248 B1 * | 7/2003 | Kama et al. | 370/342 |
| 6,615,030 B1 * | 9/2003 | Saito et al. | 455/296 |
| 6,625,201 B1 * | 9/2003 | Stirling-Gallacher | 375/144 |
| 6,647,022 B1 * | 11/2003 | Mailaender | 370/441 |
| 6,665,334 B1 * | 12/2003 | Wichman et al. | 375/148 |
| 6,667,964 B1 * | 12/2003 | Seki et al. | 370/342 |
| 6,718,162 B1 * | 4/2004 | Agin et al. | 455/63.1 |

(Continued)

FOREIGN PATENT DOCUMENTS

EP 000633677 A2 * 1/1995

(Continued)

*Primary Examiner*—Seema S. Rao
*Assistant Examiner*—Michael J. Moore
(74) *Attorney, Agent, or Firm*—Mattingly, Stanger, Malur & Brundidge, P.C.

(57) ABSTRACT

In a mobile communication system employing code division multiple accesses and having radio logical channels such as control channels and traffic channels, for the purpose of interference cancellation processing which is implemented without a large processing delay even under a call control application, the baseband receiving part of the mobile communication system includes a common control channel demodulator 302 which executes the demodulation processing of a common control channel as to a received baseband reception signal 301, an interference canceller 309 which executes interference cancellation processing for a received multiplexed signal on the basis of the notification information of the control channels, and a synthesis/error correction processor 315 which executes error correction processing, etc. as to user information having undergone the interference cancellation processing and thereafter executes frame formation processing. The common control channel is demodulated by the common control channel demodulator 302 and is not submitted to interference cancellation processing, thereby to heighten the processing speed of system information. In the interference canceller 309, cross-correlation interferences are cancelled as to the dedicated control channel and the traffic channel other than the common control channel, thereby to enhance a channel efficiency.

11 Claims, 5 Drawing Sheets

U.S. PATENT DOCUMENTS 6,760,315 B1 * 7/2004 Esmailzadeh et al. ...... 370/310

FOREIGN PATENT DOCUMENTS

| EP | 986204 | 3/2000 |
|----|--------|--------|
| EP | 000986204 A1 * | 3/2000 |
| JP | 09172427 | 6/1997 |
| JP | 2927657 | 5/1999 |
| JP | 2001520840 | 10/2001 |
| WO | 9733401 | 9/1997 |
| WO | 9941845 | 8/1999 |

* cited by examiner

BASE STATION AND MOBILE COMMUNICATION SYSTEM

This application claims a priority based on Japanese Patent Application No. 2000-144590 filed on May 12, 2000, the entire contents of which are incorporated herein by reference for all purposes.

BACKGROUND OF THE INVENTION

The present invention relates to a mobile communication system employing a code division multiple access mode having radio logical channels such as control channels and traffic channels, and more particularly to a mobile communication system and a base station in which a channel efficiency is enhanced by the processing of canceling an interference ascribable to radio logical channel signals contained in a received signal from another mobile station.

A mobile communication system employing a code division multiple access mode has features suited for mobile communications, such as immunity against a cross-correlation interference from another system, immunity against multipath fading, easy handoff, and superior security protection. In the code division multiple access mode, however, the users of a plurality of mobile stations existing within an identical base station cell communicate sharing an identical frequency band, unlike in other multiple access modes. Therefore, the code division multiple access mode has a problem that interferences are liable to occur among the mobile stations. This problem is incurred by the interference ascribable to the phenomenon in which the intense communication signal of the mobile station user near a base station conceals another weak communication signal, the interference between mobile stations by unnecessary power transmitted from at least one of them, and so forth.

Meanwhile, as countermeasures preventive of lowering in a channel efficiency, it is taken to utilize a broadband gain by widening the band of signals, to use code sequences whose cross-correlations are weak, to adopt a power control for solving a near/far effect, and so forth. Especially the power control is effective for the reason that the transmission power of each local mobile station is suppressed to the required minimum, thereby to minimize the interference between mobile stations, and also to solve the near/far effect.

Even with such countermeasures, however, increase in the cross-correlation interferences (degradation in a signal-to-noise ratio) is inevitable due to increase in the number of users who are simultaneously communicating. Therefore, it has heretofore been considered difficult to prevent the lowering of a communication quality attendant upon the cross-correlation interferences.

In a base station reception apparatus employing the code division multiple access mode, reception signals to become cross-correlation interference components from other receivable users are predictable signals, and it is not impossible to cancel the cross-correlation interference components by signal processing based on the prediction of the reception signals. Therefore, interference canceling techniques which cancel the cross-correlation interferences from the other users have been deemed potential as means for solving the problem ascribable to the interferences as stated above. By way of an example, an interference canceling technique of parallel multistage type has been studied as stated in JP-A No. 7-131382.

In the present situation, however, the application of interference cancellation to an actual system, in other words, to a system accompanying a call control application operation, has not been proposed though the interference cancellation itself has been studied.

The processing of a common control channel is necessitated in order that the call control application operation may proceed in the actual system. The common control channel is employed for systemic information notification at the initial stage of a communication start, and system notification information is obtained after the demodulation of the common control channel. Therefore, a time period longer than one radio frame is expended on the identification of the spread codes of the common control channel.

According to an interference cancellation scheme in the mobile communication system which employs the code division multiple access, the cancellation processing of the cross-correlation interferences is executed in such a way that the replica of a received user signal is generated and is subjected to signal processing. In making the common control channel a subject for the interference cancellation, therefore, it is necessary to solve the problem concerning a delay time which is involved in the demodulation of the common control channel.

The delay involved in the demodulation cannot be ignored in performing a high-speed power control. It is accordingly necessary to propose a novel system which implements the high speed power control and permits the interference cancellation processing.

SUMMARY OF THE INVENTION

An object of the present invention is to provide a mobile communication system and a base station which apply an interference cancellation processing scheme adapted to operate under the call control application of mobile communications employing code division multiple accesses.

More concretely, the mobile communication system and the base station apply an interference cancellation processing scheme adapted to operate under the call control application as solves the above problem concerning the common control channel processing, in the interference cancellation processing in the course of a call control.

According to the present invention, in a mobile communication system having radio logical channels such as control channels and traffic channels, a base station comprises signal processing means for receiving as its input signal a multiplexed wave signal in which spectrum spread signals from a plurality of radio stations are synthesized, and for canceling interference signals other than a desired signal, wherein the cancellation processing of the interference signals is executed as to specified ones of the radio logical channels in radio logical channel processing in the call control course of a demodulation apparatus.

Besides, the spectrum spread signal demodulation apparatus of the base station includes at least two demodulators; a demodulator which demodulates the radio logical channel for notifying systemic control information, and a demodulator which executes the cancellation processing of the interference signals as to the radio logical channels for transmitting control information peculiar to a user and user information.

Further, in the spectrum spread signal demodulation apparatus of the base station, the demodulated result of the demodulation of the radio logical channel for notifying the systemic control information is notified to the second-mentioned demodulator which executes the cancellation processing of the interference signals of the radio logical channels for transmitting the control information peculiar to the user and the user information.

Still further, in the spectrum spread signal demodulation apparatus of the base station, the cancellation processing of the interference signals of the radio logical channels for transmitting the control information peculiar to the user and the user information is executed on the basis of the demodulated result of the demodulation of the radio logical channel for notifying the systemic control information.

In a mobile communication system employing a code division multiple access mode such as W-CDMA mode, a channel configuration having, as radio logical channels, control channels, traffic channels, etc. is employed. Further, the control channels include a common control channel which notifies systemic information from a base station to a mobile station, or vice versa, and a dedicated control channel which transmits control information by the point-to-point connection between the base station and the mobile station. A call control operation is performed on the basis of the control information items, and user information is transmitted through the traffic channel.

In an interference canceling scheme employed for the code division multiple access mode, interference signals are canceled in such a way that receivable user signals are despread and re-spread, that replica signals are generated by synthesizing re-spread signals, and that the replica signals are subtracted from the received signals. Therefore, the interference cancellation processing is possible only for the received signals whose codes can be identified and which can be subjected to the despreading and the re-spreading.

In processing at the communication start of a call control application operation, the systemic information such as the spread code of the mobile station notified through the common control channel is acquired. Since the control information through the common control channel has its content found after the execution of demodulation processing up to error correction processing, all signals including the other received signals need to be delayed in order to execute the signal processing, such as re-spreading and despreading, for the interference cancellation. The delays cannot be ignored in implementing a high speed power control, or the like.

In the mobile communication system of the present invention, therefore, a common control channel demodulator and an interference canceller are provided as the construction of a baseband receiving part. The common control channel is demodulated by the common control channel demodulator without being subjected to interference cancellation processing, thereby to heighten the processing speed of the systemic information. In the interference canceller, the cancellation processing of cross-correlation interferences is executed as to the dedicated control channels and the traffic channels other than the common control channel, thereby to enhance a channel efficiency. On this occasion, the systemic information which is the demodulated result of the common control channel is notified to the interference canceller, and it is used for the signal processing in the interference canceller. The user information having undergone the interference cancellation processing by the interference canceller is subjected to processing such as the error correction, and is sent to a transmission path interface.

DESCRIPTION OF THE PREFERRED EMBODIMENTS

Now, an embodiment of a mobile communication system according to the present invention will be described in detail with reference to the drawings.

Figure 1:
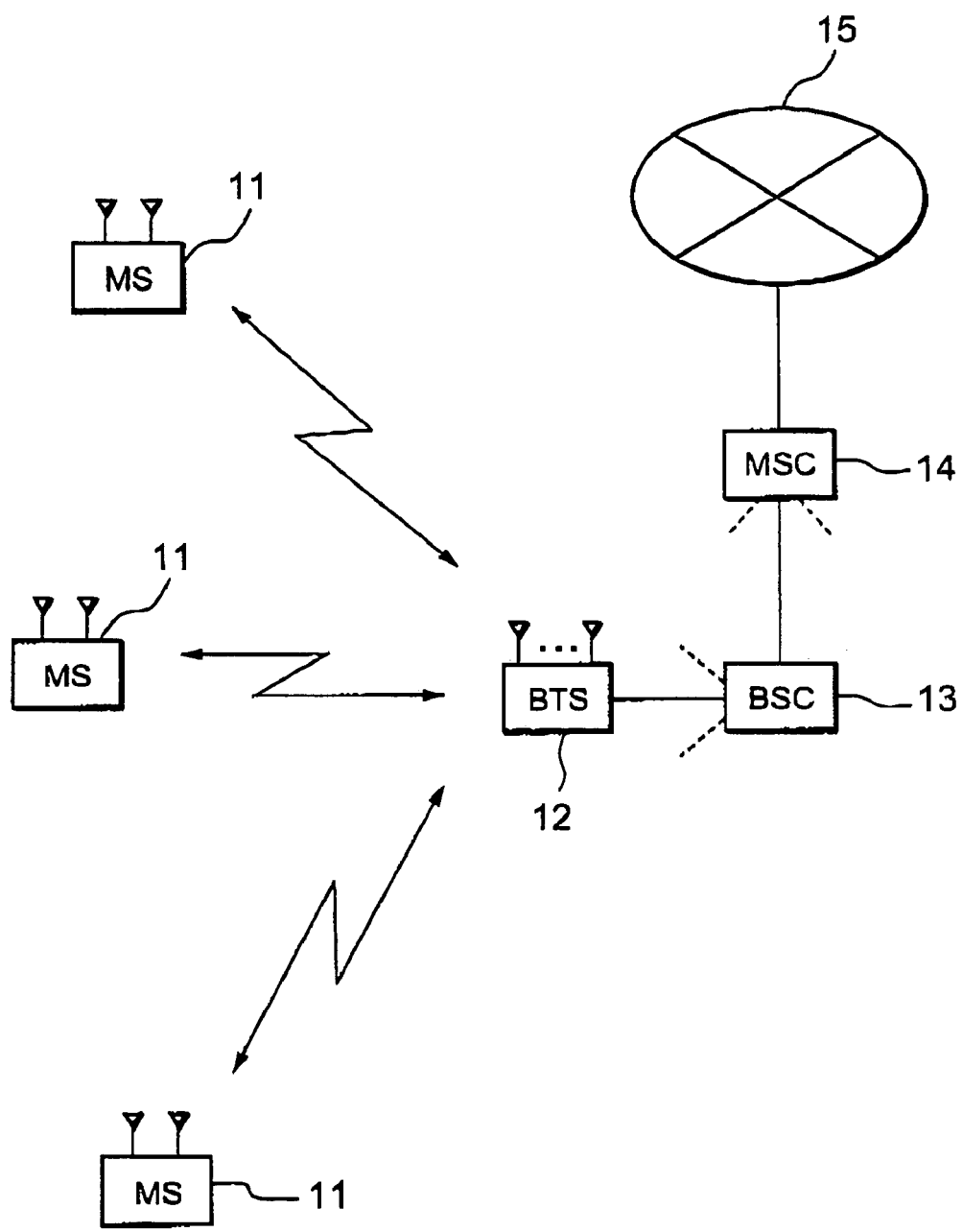
FIG. 1 is a block diagram showing the configuration of a mobile communication system employing code division multiple accesses in an embodiment of the present invention.
Figure 2:
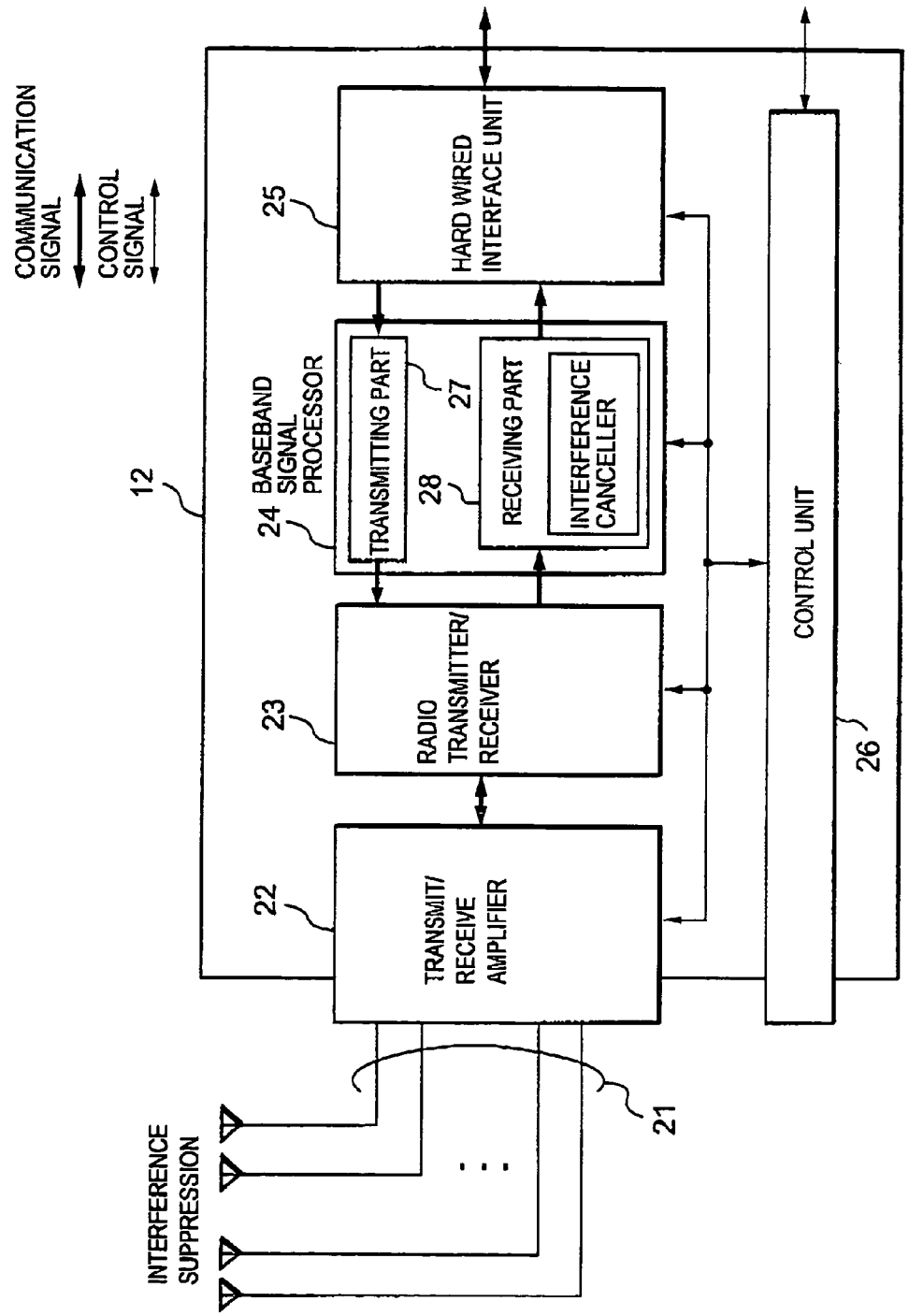
FIG. 2 is a block diagram showing an example of construction of a base station which has an interference canceling function.

FIG. 1 is a block diagram showing the configuration of the mobile communication system employing code division multiple accesses in one embodiment of the present invention, while FIG. 2 is a block diagram showing the configuration of a base station which has interference canceling means. Referring to FIGS. 1 and 2, numeral 11 designates a mobile station (MS), numeral 12 a base transceiver station (BTS), numeral 13 a base station controller (BSC), numeral 14 a mobile switching controller (MSC) numeral 15 a public switched telephone network (PSTN), numeral 21 an antenna constellation, numeral 22 a transmit/receive amplifier, numeral 23 a radio transmitter/receiver, numeral 24 a baseband signal processor, numeral 25 a hard wired interface unit, and numeral 26 a control unit, As shown in FIG. 1, the mobile communication system to which the present invention is applied is connected to the public switched telephone network 15, and it includes the mobile stations 11, the base station 12 which communicates with the plurality of mobile stations 11 by employing the code division multiple access mode, the base station controller 13 which is connected to the plurality of base stations 12 and which submits the mobile stations 11 to diversity handover processing by executing the selective synthesis processing and distribution processing of communication signals and control signals, and the mobile switching controller 14 which is connected with the plurality of bass station controllers 13 and other communication facilities and which executes the switch processing of the communication signals. Incidentally, in the description of this embodiment, the protocol "IMT-2000" shall be cited as the code division multiple access mode which is configured of a common control channel and other logical channels.

The mobile stations 11 and the base station 12 communicate in conformity with the code division multiple access mode. Herein, the plurality of mobile station users existing in the radio area of the base station 12 use the same frequency band, and the individual communications are separated using codes different from one another Moreover, processing such as a power control is executed in order to solve a near/far effect ascribable to the phenomenon that the intense communication signal of a mobile station user near the base station 12 conceals the weak communication signal of any other mobile station user.

The base station controller 13 has the plurality of base stations 12 connected thereto, and it executes the processing of selectively synthesizing the communication signals and the control signal sent from the respective base stations 12 and the processing of distributing the communication signals and the control signals to the respective base stations 12. Besides, the base station controller 13 executes diversity handover processing in which the communication signals are switched between the base stations 12, in a case where the mobile station 11 has moved from the radio area covered by one of the base stations 12, to the radio area covered by the other base station 12.

As shown in FIG. 2, the base station 12 includes the antenna constellation 21, transmit/receive amplifier 22, radio transmitter/receiver 23, baseband signal processor 24, hard wired interface unit 25, and control unit 26. The baseband signal processor 24 is constituted by a baseband transmitter 27, and a baseband receiver 28.

The antenna constellation 21 for transmitting/receiving radio signals has two transmission/reception antennas per communication area in order to perform diversity reception. In the case of the base station whose communication area conforms to the processing of a plurality of sectors, the antenna constellation includes a plurality of antennas in accordance with the number of the sectors.

The transmit/receive amplifier 22 includes a transmission amplifier for amplifying the radio signals to-be-transmitted, and a low noise amplifier for amplifying the received radio signals. It demultiplexes/multiplexes the radio transmission signals and the radio reception signals.

The radio transmitter/receiver 23 includes a radio transmitter, and a radio receiver. The radio transmitter D/A-converts transmission signals subjected to baseband signal processing, modulates the resulting analog signals by orthogonal modulation, converts the modulated signals into radio frequency signals, and sends the radio frequency signals to the transmission amplifier of the transmit/receive amplifier 22. On the other hand, the radio receiver converts received signals from the reception amplifier of the transmit/receive amplifier 22, into baseband signal frequencies, detects the frequencies by quasi-synchronous detection, A/D-converts the detected signals, and transfers the resulting digital signals to the baseband signal processor 24.

The baseband signal processor 24 includes the baseband transmitter 27 which executes such signal processing as the error correction encoding, framing, data modulation and spreading modulation of transmission data, and the baseband receiving part 28 which executes such signal processing as the reception synchronization, despreading, interference cancelling, error correction decoding, and data multiplexing/demultiplexing of received signals from the radio transmitter/receiver 23, and the synthesis of the maximum ratio of the received signals at the diversity handover between the sectors.

The hard wired interface unit 25 is the interface unit of the transmission line between the base station 12 and the base station controller 13. It transmits and receives communication signals to and from the base station controller 13.

The control unit 26 transmits and receives control signals to and from the base station controller 13, and it performs the management of radio channels, the setting/resetting of the radio channels. etc.

Figure 3:
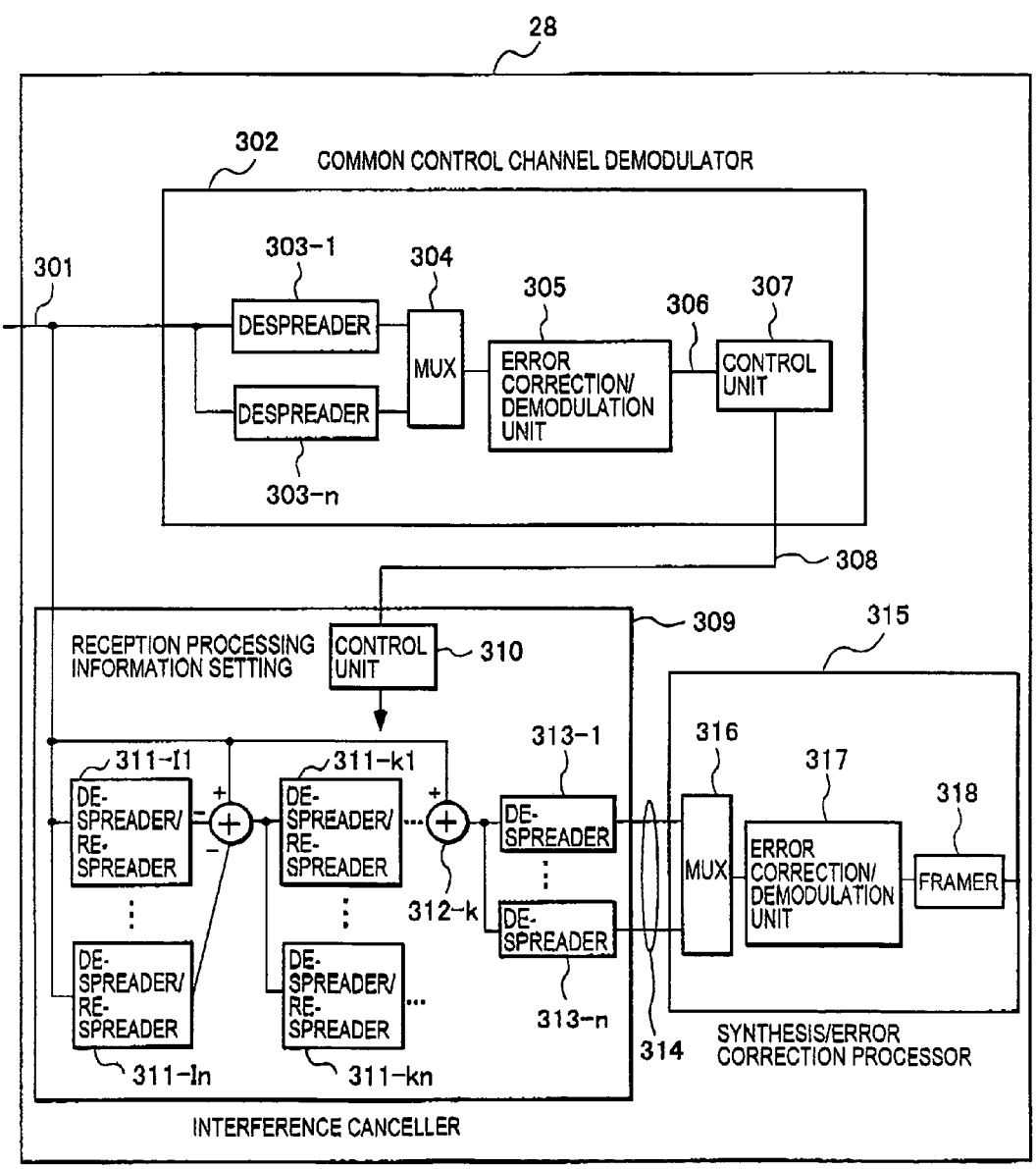
FIG. 3 is a block diagram showing an example of construction of a baseband receiving part included in a baseband signal processor.
Figure 4:
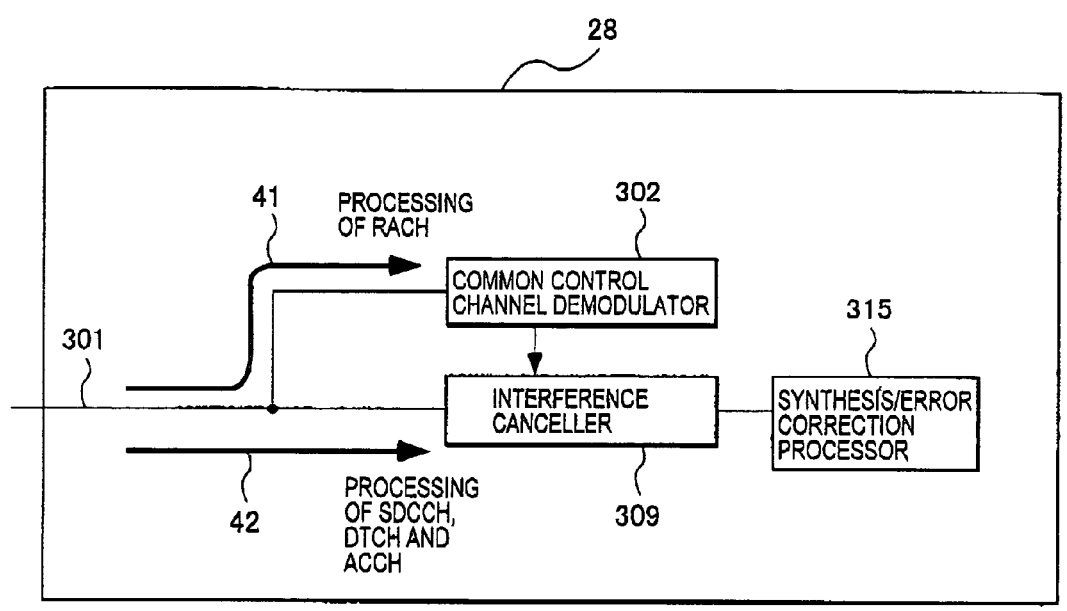
FIG. 4 is a diagram for explaining logical channels which execute processing in the baseband receiving part included in the baseband signal processor.
Figure 5:
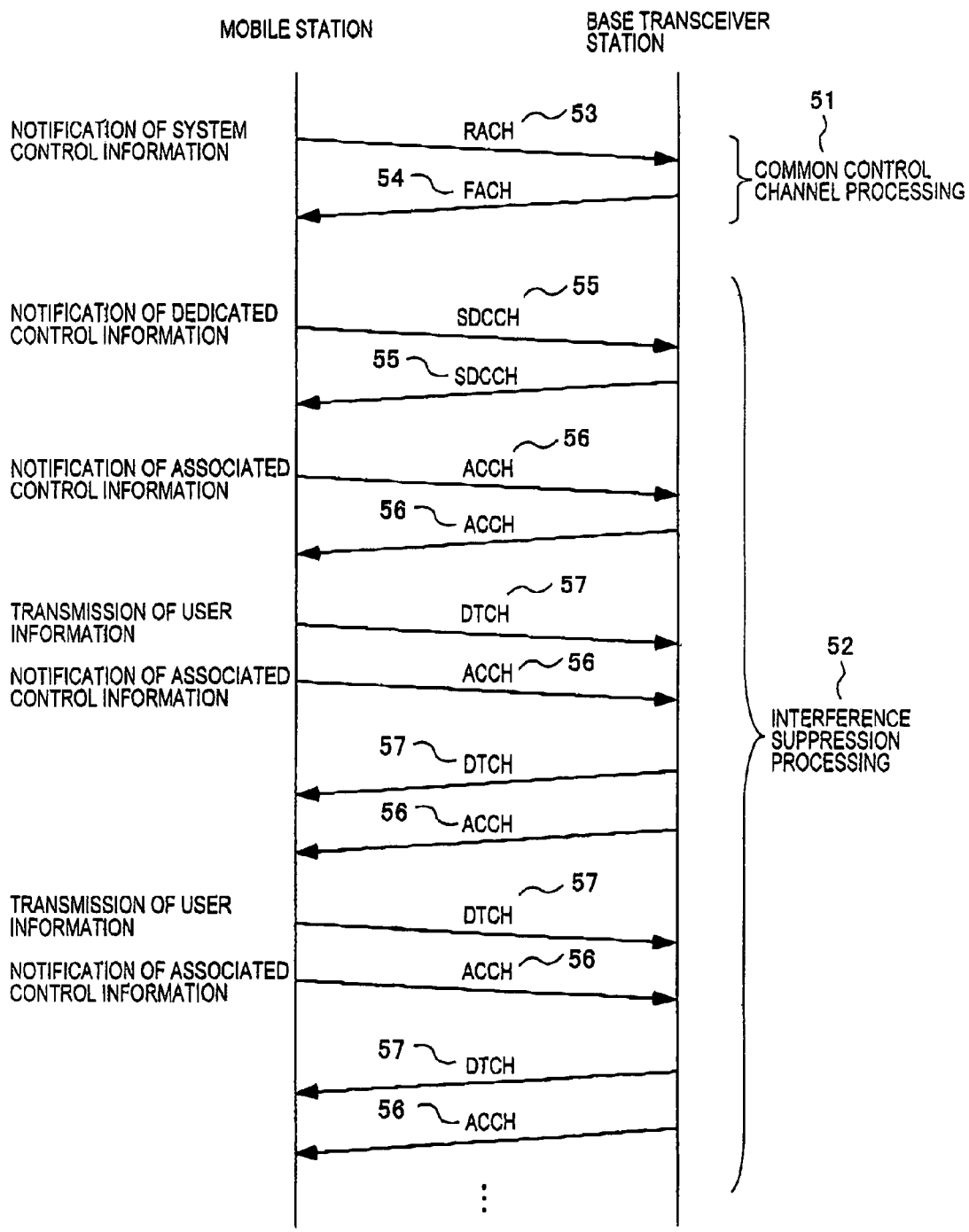
FIG. 5 is a diagram for explaining an example of connecting procedure at the communication start of a call control application operation.

FIG. 3 is a block diagram showing an example of construction of the baseband receiving part 28, FIG. 4 is a diagram for explaining logical channels which execute processing in the baseband receiving part 28, and FIG. 5 is a diagram for explaining an example of connecting procedure at the communication start of a call control application operation in the mobile communication system. Interference cancellation processing under a call control application in accordance with an embodiment of the present invention will be described with reference to these figures.

Referring to FIGS. 3, 4 and 5, the baseband receiving part 28 shown in FIG. 2 includes a common control channel demodulator 302, an interference canceller 309, and a synthesis/error correction processor 315. In the baseband receiving part 28 according to the present invention, it is to be specially mentioned that the common control channel demodulator 302 is provided at a stage preceding the interference canceller 309. More specifically, the received signal inputted from the antenna constellation 21 to the radio transmitter/receiver 23 via the transmit/receive amplifier 22 is converted by this radio transmitter/receiver 23 into the baseband reception signal, which is inputted to the baseband receiving part 28 of the baseband signal processor 24 and which is submitted to the demodulation processing of the common control channel by the common control channel demodulator 302 without executing the interference cancellation processing. This enables reducing a period for up to the demodulation of the spread codes of the common control channel thereby to implement a high speed power control.

Reference will be made particularly to FIG. 3. The baseband reception signal is shown at numeral 301. The common control channel demodulator 302 includes despreaders 303-1 through 303-n, a signal multiplexer 304, an error correction/demodulation unit 305, and a control unit (common control channel demodulation unit) 307. Numeral 306 designates a common control channel demodulation signal which is delivered from the demodulation unit 305 to the control unit 307. Numeral 308 designates a control signal which is delivered from the control unit 307 to the interference canceller 309. The interference canceller 309 includes a control unit (interference cancellation unit) 310, despreaders/re-spreaders 311 (311-11 through 311-In, 311-k1 through 311-kn), signal adder 312-1 through 312-k, and despreaders 313 (313-1 through 313-n). Numeral 314 designates demodulation signals which are delivered from the despreaders 313 to the synthesis/error correction processor 315.

The synthesis/error correction processor 315 includes a signal multiplexer 316, an error correction/demodulation unit 317, and a framer 318.

Reference will be made particularly to FIGS. 4 and 5. Numeral 41 designates the processing of the common control channel (RACH), and numeral 42 that of channels intended for the interference cancellation (SDCCH, ACCH, DTCH). Numeral 51 designates the course of the common control channel demodulation processing, and numeral 52 that of the interference cancellation processing. Numeral 53 indicates a random access channel (RACH), numeral 54 a forward access channel (FACH), numeral 55 a stand alone dedicated control channel (SDCCH), numeral 56 an associated control channel (ACCH), and numeral 57 a dedicated traffic channel (DTCH).

As shown in FIG. 3, the embodiment of the baseband receiving part 28 in the mobile communication system to which the present invention is applied includes the common control channel demodulator 302 which executes the demodulation processing of the common control channel as to the received baseband reception signal 301, the interference canceller 309, and the synthesis/error correction processor 315.

Here, the interference canceller 309 included in the baseband receiving part 28 in the mobile communication system to which the present invention is applied, can be implemented by an interference cancellation processing method of parallel multistage type as shown in FIG. 3, but this method is not restrictive. More specifically, in the present invention, interference cancellation processing is not performed for all logical channels stipulated in, for example, the protocol IMT-2000, but it is performed for a dedicated control information notification channel, an associated control information notification channel, a user information transmission channel, etc. except the common control channel which is used for systemic information notification in the call control application. Thus, a processing delay ascribable to the interference cancellation processing can be largely decreased to implement the high speed power control. It is allowed to adopt any interference cancellation processing method by which this effect is expected.

The common control channel demodulator 302 is constituted by the despreaders 303-1 through 303-n, the signal multiplexer 304, the error correction/demodulation unit 305, and the control unit 307. Here, the common control channel in the received baseband reception signal 301 is subjected to despreading by the despreaders 303-1 through 303-n, the resulting despread signals are multiplexed by the signal multiplexer 304, and the resulting multiplexed signal is subjected to error correction processing and demodulation processing by the error correction/demodulation unit 305. The common control channel demodulation signal 306 after the demodulation processing is sent to the control unit 307. The control unit 307 notifies information items such as the initial values of the spread codes necessary for the signal processing of the interference canceller 309, to this interference canceller 309 as the control signal 308.

The interference canceller 309 is constituted by the control unit 310, the despreaders 311-I1 through 311-In/respreaders 311-k1 through 311-kn, the signal adding parts 312-1 through 312-k, and the despreaders 313-1 through 313-n, and it executes interference cancellation processing as to the stand alone dedicated control channel (SDCCH), associated control channel (ACCH) and dedicated traffic channel (DTCH) of the baseband reception signal. The control unit 310 sets spread ratios, the spread code initial values and despread timings in the constituent signal processing units of the interference canceller 309 on the basis of the control signal 308 sent from the control unit 307 of the common control channel demodulator 302, and information items such as the spread ratios obtained from the demodulated result of the stand alone dedicated control channel (SDCCH). The interference cancellation processing is executed by the despreaders/re-spreaders 311, signal adder 312 and despreaders 313 on the basis of the setting information items from the control unit 310, and the resulting processed signals are sent to the synthesis/error correction processor 315 as the demodulated signals 314.

The synthesis/error correction processor 315 includes the signal multiplexer 316, the error correction/demodulation unit 317, and the framer 318. Here, error correction processing, etc. are performed for user information subjected to the interference cancellation processing, the resulting signal is subjected to frame formation processing, and the resulting frame is transmitted to the transmission path interface (25 in FIG. 2). More specifically, the received signals of the user information items from the interference canceller 309 are submitted to time multiplexing in a frame unit by the signal multiplexer 316, and the time-multiplexed frames are subjected to the error correction processing by the error correction/demodulation unit 317. The time-multiplexed signals submitted to the error correction are formed into an appropriate frame by the framer 318, and this frame is sent to the transmission path interface.

Logical channels which are subjected to signal processing in the common control channel demodulator 302 and the interference canceller 309, will be explained with reference to FIG. 4. As shown in FIG. 4, the random access channel (RACH) being the common control channel is processed in the common control channel demodulator 302, and the other channels; the stand alone dedicated control channel (SDCCH), dedicated traffic channel (DTCH) and associated control channel (ACCH) are subjected to the interference cancellation processing in the interference canceller 309. The demodulation signals subjected to the interference cancellation are sent toward the transmission path interface.

The common control channel demodulator 302 and the interference canceller 309 do not have the control functions of distributing the respectively corresponding signals, and all the received signals are inputted to the demodulating parts of them. Since the radio logical channels have undergone spread processing in accordance with respectively peculiar codes, the respectively corresponding radio logical channels are subjected to the demodulation processing in the common control channel demodulator 302 and the interference canceller 309. In the interference canceller 309, interferences ascribable to the user signals other than the common control channel, among all the received signals, are subjected to the cancellation processing.

Next, the processing of the logical channels as viewed from the connecting procedure in the call control application operation conforming to the protocol IMT-2000 in the case of the code division multiple accesses will be explained with reference to FIG. 5. As shown in FIG. 5, when a call has issued from any mobile station, communication is established through the random access channel (RACH) 53 which is a one-way channel for transmitting control information from the mobile station to the base station, the forward access channel (FACH) 54 which is a one-way channel for transmitting control information from the base station to the mobile station, the stand alone dedicated control channel (SDCCH) 55 which transmits control information in two ways by the point-to-point connection between the base station and the mobile station, the dedicated traffic channel (DTCH) 57 which transmits user information in two ways by the point-to-point connection between the base station and the mobile station, and the associated control channel (ACCH) 56 which is a control channel associated with the DTCH and which transmits control signals in two ways by the point-to-point connection between the base station and the mobile station. The connecting procedure comprises the common control channel demodulation processing course 51 and the interference cancellation processing course 52.

Processing at the communication start of the call control application operation is in the common control channel demodulation processing course 51, and system information such as the spread code of the mobile station is notified and acquired through the random access channel (RACH) 53 which is the common control channel transmitted from the mobile station, Since the control information through the random access channel (RACH) 53 has its content found after the execution of the demodulation processing up to the error correction processing, it is demodulated by the common control channel demodulator 302 without the interference cancellation processing, and the control signal 308 being the demodulated result is notified to the interference canceller 309.

The subsequent processing steps are in the interference cancellation processing course 52. The interference cancellation processing is executed for the stand alone dedicated control channel (SDCCH) 55 and the dedicated traffic channel (DTCH) 57 which notify the dedicated information of the mobile station and such information as the spread ratio of the traffic channel, respectively, and for the associated control channel (ACCH) 56 which notifies the control information necessary for the handover processing in association with the dedicated traffic channel (DTCH) 57. In this embodiment, the channels which are subjected to the interference cancellation processing shall be generically defined as "communication channels".

Regarding the stand alone dedicated control channel (SDCCH) 55 which notifies the dedicated information of the traffic channel mobile station and information on the spread ratio of the traffic channel, such control information as the spread ratio of the traffic channel is obtained after the demodulation processing. Since, however, the spread ratio of the stand alone dedicated control channel (SDCCH) 55 itself is fixed and is known, the interference cancellation processing is possible. Regarding the succeeding dedicated traffic channel (DTCH) 57 and associated control channel (ACCH) 56, the interference cancellation processing and the demodulation processing are executed on the basis of the control information items received through the random access channel (RACH) and stand alone dedicated control channel (SDCCH) which are control channels. Owing to the series of processing steps, the cross-correlation interference from any other mobile station is cancelled to enhance a channel efficiency.

The foregoing embodiments have been described by citing the protocol IMT-2000 as the code division multiple access mode which is composed of the common control channel and the other logical channels. Needless to say, however, the present invention is similarly applicable to any other protocol conforming the code division multiple access mode as is capable of utilizing the technical idea that the interference cancellation processing is not executed for the common control channel which is used for the systemic information notification in the call control application, and that it is executed for the traffic channels other than the common control channel, such as the dedicated control information notification channel, associated control information notification channel and user information transmission channel, whereby the processing delay ascribable to the interference cancellation processing is largely decreased to permit the high speed power control.

As thus far described, it is possible to propose the means and the base station for solving the problem concerning the common control channel processing in the interference cancellation processing in the course of the call control of the mobile communication system employing the code division multiple accesses, and to provide the mobile communication system which applies the interference cancellation processing method which can operate under the call control application.

What is claimed is:

1. A base station which is used in a mobile communication system having radio logical channels including control channels and traffic channels, said control channels include a common control channel and a dedicated control channel, said base station, comprising:
   a signal processor for receiving an input signal of a multiplexed signal in which a plurality of spectrum spread signals are synthesized, and for canceling cross-correlation interferences among the dedicated control channel and the traffic channels other than a desired signal;
   wherein said base station executes a cancellation processing of the cross-correlation interferences among the dedicated control channel and the traffic channels except in the common control channel in radio logical channel processing in a call control course.

2. A base station as defined in claim 1, comprising:
   a first demodulator which demodulates the radio logical channels for notifying systemic control information; and
   a second demodulator which has an interference canceller for executing the cancellation processing of interference signals in the radio logical channels for transmitting control information peculiar to a user and user information.

3. A base station as defined in claim 2, wherein the first demodulator notifies a demodulated result of the demodulation of said radio logical channel for notifying the systemic control information to the interference canceller of the second demodulator, which executes said cancellation processing of said interference signals of said radio logical channels for transmitting the control information peculiar to the user and the user information.

4. A base station as defined in claim 3, wherein said interference canceller executes said cancellation processing of said interference signals of said radio logical channels for transmitting said control information peculiar to said user and said user information on the basis of the demodulated result of said demodulation of said radio logical channel for notifying said systemic control information.

5. A base station which transmits and receives information to and from a plurality of radio stations through radio channels including control channels and communication channels separated by different codes, said control channels include a common control channel and a dedicated control channel, said base station comprising:
   a common control channel demodulator which demodulates spread signals inputted via the common control channel without executing cross-correlation interference cancellation processing; and
   an interference canceller which executes cross-correlation interference cancellation processing among the dedicated control channel and the communication channels as to spread signals inputted via the communication channels, and which outputs signals resulting from the cross-correlation interference cancellation processing as demodulated signals;
   wherein said base station executes the cross-correlation interference cancellation processing except in the common control channel in a call control course.

6. A base station as defined in claim 5, wherein said demodulator notifies a demodulated result of the demodulation of the radio logical channel for notifying systemic control information to said interference canceller which executes said cancellation processing of the interference signals of the radio logical channels for transmitting control information peculiar to a user and user information.

7. A base station as defined in claim 6, wherein said interference canceller executes said cancellation processing of said interference signals of said radio logical channels for transmitting the control information peculiar to the user and the user information on the basis of the demodulated result of said demodulation of said radio logical channel for notifying the systemic control information.

8. A base station to communicate with radio stations through control channels and communication channels spread by different codes, said control channels include a common control channel and a dedicated control channel, said base station comprising:
an antenna constellation which receives spread signals from the plurality of radio stations, a reception amplifier which amplifies the signals from said radio stations as received by said antenna constellation, a radio transmitter/receiver which converts reception signals from said reception amplifier into baseband signal frequencies, and a baseband processor which executes reception synchronization, despreading, cross-correlation interference cancellation, error correction decoding, and data multiplexing/demultiplexing of the baseband signals from said radio transmitter/receiver;
wherein said baseband processor includes:
a common control channel demodulator which demodulates the spread signals inputted via the common control channel without executing cross-correlation interference cancellation processing; and
an interference canceller which executes cross-correlation interference cancellation processing among the dedicated control channel and the communication channels as to the spread signals inputted via the communication channels, and which outputs signals resulting from the cross-correlation interference cancellation processing as demodulated signals;
wherein said base station executes the cross-correlation interference cancellation processing except in the common control channel in a call control course.

9. A base station as defined in claim 8, wherein said antenna constellation includes two transmission/reception antennas per communication area or sector for the purpose of diversity reception.

10. A base station as defined in claim 8, wherein said interference canceller executes said cancellation processing of the interference signals of the radio logical channels for transmitting control information peculiar to a user and user information on the basis of a demodulated result of the demodulation of the radio logical channel for notifying systemic control information.

11. A mobile communication system having a plurality of radio stations and a base station which is connected to a network through a base station controller, and which transmits and receives information to and from the plurality of radio stations through control channels and communication channels separated by different codes, said control channels include a common control channel and a dedicated control channel, said base station comprising:
a common control channel demodulator which demodulates spread signals inputted via the common control channel without executing cross-correlation interference cancellation processing;
an interference canceller which executes cross-correlation interference cancellation processing among the dedicated control channel and the communication channels as to spread signals inputted via the communication channels, and which outputs signals resulting from the cross-correlation interference cancellation processing as demodulated signals; and
an error correction processor which executes error correction processing for the signals from said interference canceller, and which transmits the resulting signals to said station controller;
wherein said base station executes the cross-correlation interference cancellation processing among the dedicated control channel and the communication channels except in the common control channel in a call control course.

* * * * *